Figure 3:
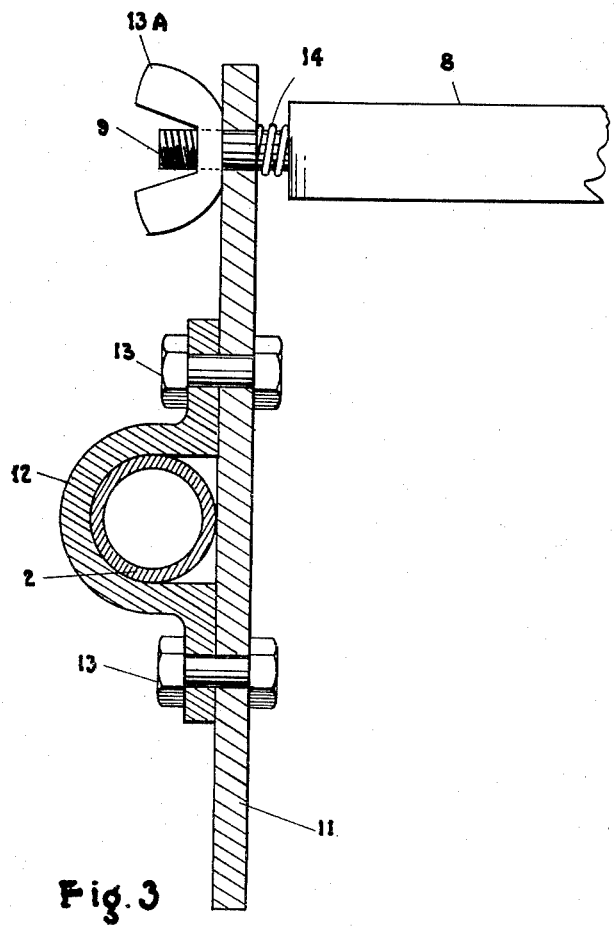

Feb. 20, 1951   A. KAPIT ET AL   2,542,335
BROILER UNIT
Filed May 24, 1949   3 Sheets-Sheet 1
Fig. 1
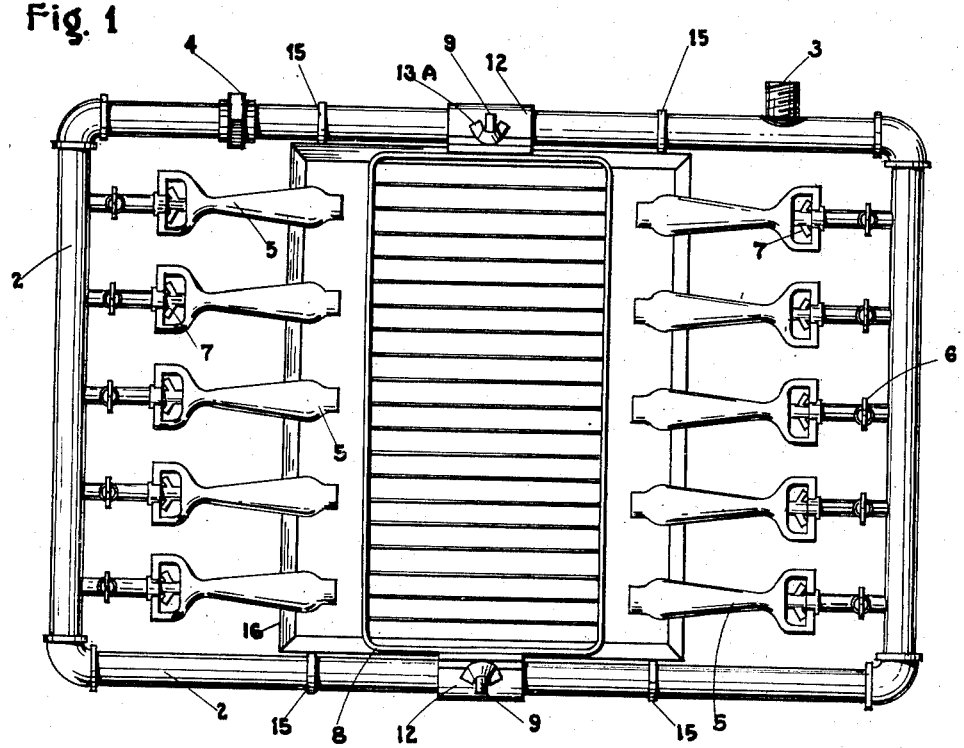
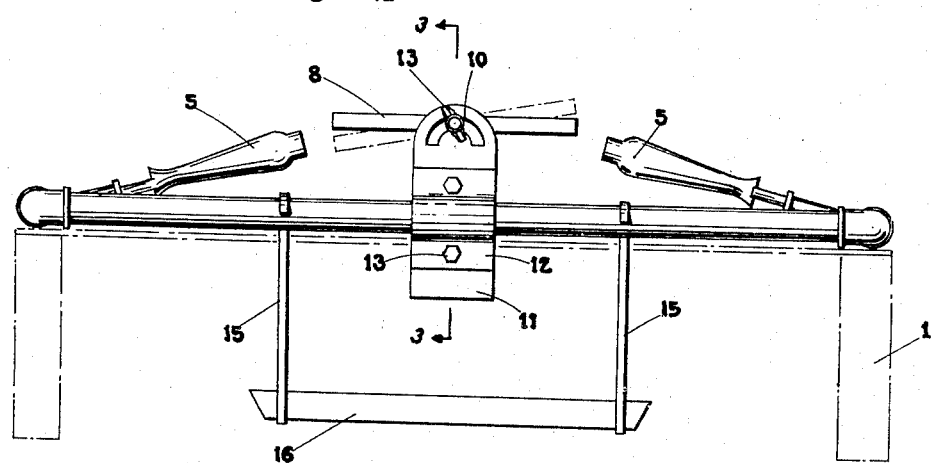
Fig. 2
INVENTORS
Aaron Kapit and Evelyn Kapit Feb. 20, 1951  A. KAPIT ET AL  2,542,335
BROILER UNIT
Filed May 24, 1949  3 Sheets-Sheet 3
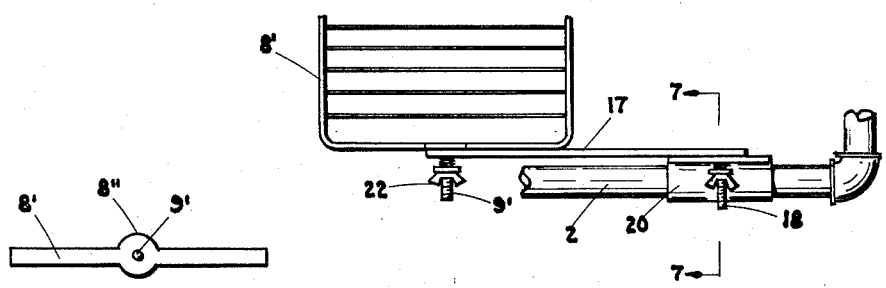
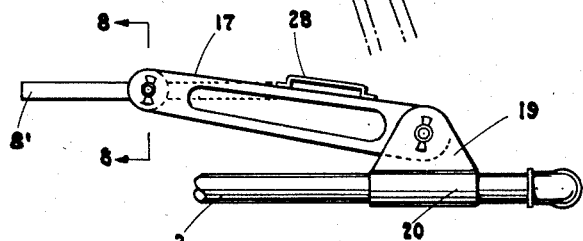
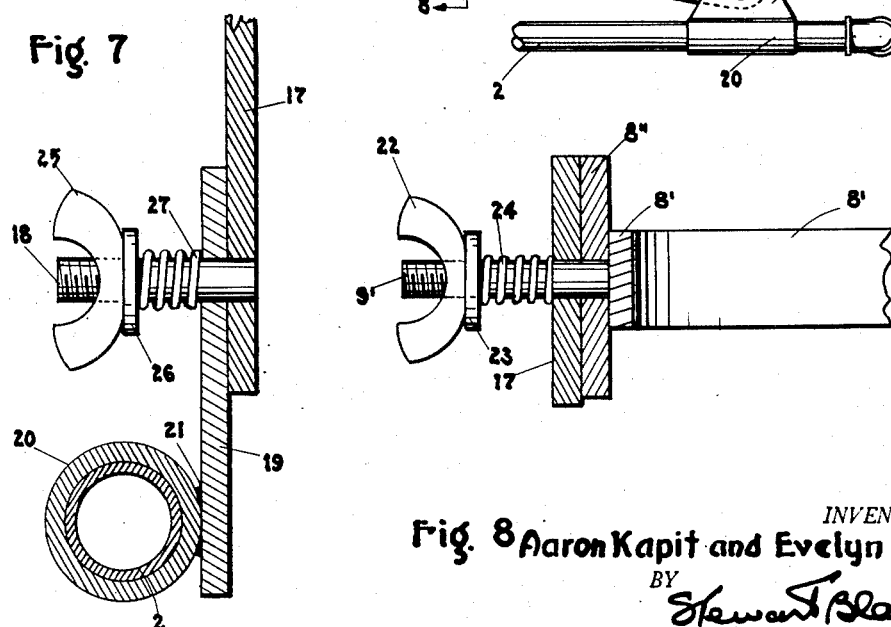
INVENTORS
Aaron Kapit and Evelyn Kapit Patented Feb. 20, 1951

2,542,335

UNITED STATES PATENT OFFICE 2,542,335

BROILER UNIT

Aaron Kapit and Evelyn Kapit, Miami, Fla.

Application May 24, 1949, Serial No. 95,012

2 Claims. (Cl. 99—443)

The invention relates to a broiler unit, and more particularly, to firing apparatus having application to the roasting or barbecuing of meats.

An object of the invention is to provide a broiler unit which will be simple and compact in construction and efficient in operation.

Another object is to provide a broiler apparatus which may be readily and economically manufactured.

A further object is to provide a broiler unit with a grill and support therefor, which may be readily and conveniently manipulated in use.

Other advantages of the invention will be discernible from the detailed description thereof hereinafter set forth.

According to the invention, the broiler unit comprises a fuel conducting frame, a grill arranged therein and means to adjustably support the grill to permit its ready and convenient manipulation in respect to the frame, and burner nozzle batteries connected to the frame and directed toward the grill for the efficient application of heat to the meat supported thereon.

The invention is embodied in a broiler unit exemplified in the accompanying drawings in which the views are as follows, like reference numerals designating identical parts throughout the several views:

Fig. 1, a plan of the unit; and

Fig. 2, an elevation thereof.

Fig. 3, a section taken on line 3—3 of Fig. 2;

Fig. 4, an elevation of a grill supporting means utilized with the invention; and Fig. 5, a plan thereof.

Fig. 6, an end elevation of a grill utilized with the invention;

Fig. 7, a section taken on line 7—7 of Fig. 5, and

Fig. 8, a section taken on line 8—8 of Fig. 4.

The broiler unit is mountable upon a suitable structural frame, shown generally at 1, or may be installed on any brick or masonry setting conventional in the art.

Arranged upon the frame 1, is a rectangular, fuel-conducting manifold 2, fitted with an intake nipple 3 and a make-up union 4 to facilitate the assembly of the manifold piping.

Communicating with opposite sides of the manifold and inwardly and upwardly directed therefrom, is a pair of burner nozzle batteries 5, adapted to project the flame jets therefrom toward the central region of the manifold 2. These burner nozzles may extend horizontally, as illustrated in Fig. 1, or may be inclined as exemplified in Fig. 2. Suitable stop cocks 6 and wing-nut valves 7 are associated with each nozzle for the individual control of the jets therefrom.

The broiler unit has a grill 8 superposed above the central region of the manifold, the frame of which is fitted at each end with an endwise extending central shaft 9 adapted to be received into an arcuate slot 10 formed in an upstanding bracket 11. This bracket is secured to the manifold piping at each end of the grill, being held in place by clamp members 12 which are fastened to the brackets by bolts 13 passed therethrough.

Threaded upon each of the shafts 9, is a wing nut 13A adapted to bear against the bracket 11 whereby to fix the grill in angular or tilting relation to the burner nozzles thereunder. The shaft is encircled by a coil spring 14 interposed between the bracket 11 and the adjacent grill frame to permit a flexible and convenient tightening of the wing nut assembly. Thus, the grill is both tiltable and rockable in relation to the burner jets therebelow, the shafts 9 being movable along the arcuate slots 10, as will be understood.

Suspended from the manifold structure, is a drip pan 16 which is provided with hangers 15 having their upper ends hooked for engagement with the manifold piping for suspension therefrom.

Figs. 5 to 8 exemplify another form of grill supporting means employed with the burner unit, wherein the grill 8' has formed at each end and centrally thereof a circular plate 8'', from which the shafts 9' are outwardly extended. These shafts are pintled in the upper end of an arm 17, to form a pivotable connection therewith. At its lower end, the arm 17 is pivoted by a shaft 18 to an upstanding bracket 19 which is carried by an elongated sleeve or collar 20, welded as at 21 to the bracket. The collar 20 may be secured to the manifold in any suitable manner known in the art.

The grill shafts 9' have threaded thereon, a wing nut 22 adapted to bear against a washer 23. Interposed between the washer and the adjacent arm 17, is a coil spring 24 to provide a flexible and readily adjustable fastening to the grill shaft 9'. The pivot shaft 18 is likewise fitted with a wing nut 25 threaded thereon and a washer 26 and coil spring 27 are arranged about this shaft to permit the ready fastening of the pivotable connection thus effected.

It will be understood that the meeting faces of the plate 8'' and arm 17, and of this arm and the bracket 19, may be scored radially thereof to provide a positive frictional connection therebetween. While the figures illustrate the arm 17 and its associated mechanisms as installed on one side of the unit, it will be understood that these parts are adapted, alternately, to the opposite side of the unit, being formed of opposite hand to those shown in the drawings.

The operation of the unit will be apparent from the hereinabove described apparatus. The grill is tiltable at any desired angle to effect the proper broiling of meat carried thereby, and by virtue of the grill-supporting means herein provided, the grill is rockable to its position shown in broken lines in Fig. 4 whereby to withdraw the grill from its firing position.

A suitable handle, fabricated of any heat-resistant material, may be attached, as at 28, to the arms 17, to permit the safe and convenient manipulation of the grill structure.

Our invention is thus seen to provide the characteristics set forth in the objectives thereof, and various modifications may be effected in the invention without departing from the scope thereof as hereinafter claimed.

Having thus described the invention and the mode of its practice, what we claim as new and desire to secure by Letters Patent is:

1. In a broiler unit of the character described, the combination of a tubular frame adapted to conduct liquid or gaseous fuel, a grill carried by said frame centrally thereof, a pair of opposed burner nozzle batteries each connected to said frame to direct the nozzles thereof toward said grill, a pair of grill supporting arms pivoted at one end to said grill and at the opposite end to said frame whereby to permit said grill to oscillate in relation to said frame and to tilt in relation to said arms, means to adjustably secure said grill to said arms and means to adjustably secure said arms to said frame, and a drip pan suspended from said frame.

2. In firing apparatus of the character described, a tubular, fuel-conducting, rectangular frame, a source of fuel therefor communicating therewith, a pair of burner nozzle batteries each connected to opposite sides of said frame and upwardly inclined therefrom, a grill supported by said frame centrally thereof and thereabove, a pair of grill-supporting arms pivoted at one end thereof to said grill and at the opposite end thereof to said frame to permit the tilting and oscillation of said grill relative to said burner batteries, handle means secured to said arms, means to clamp said grill to said arms and said arms to said frame, and a drip pan suspended from said frame.

AARON KAPIT.
EVELYN KAPIT.

REFERENCES CITED

The following references are of record in the file of this patent:

UNITED STATES PATENTS

| Number | Name | Date |
|---|---|---|
| 732,470 | Tatham | June 30, 1903 |
| 1,045,049 | Longfellow et al. | Nov. 19, 1912 |
| 1,718,961 | Humphrey | July 2, 1929 |
| 1,769,893 | Uhl | July 1, 1930 |
| 1,772,171 | Wells | Aug. 5, 1930 |
| 2,001,116 | Smith | May 14, 1935 |